United States Patent
Mueller et al.

(10) Patent No.: US 6,298,720 B1
(45) Date of Patent: Oct. 9, 2001

(54) MEASUREMENT DEVICE FOR MEASURING THE MASS OF A MEDIUM FLOWING IN A LINE

(75) Inventors: Wolfgang Mueller, Rutesheim; Uwe Konzelmann, Asperg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/284,603

(22) PCT Filed: May 16, 1998

(86) PCT No.: PCT/DE98/01364

§ 371 Date: May 28, 1999

§ 102(e) Date: May 28, 1999

(87) PCT Pub. No.: WO99/09378

PCT Pub. Date: Feb. 25, 1999

(30) Foreign Application Priority Data

Aug. 19, 1997 (DE) ............................................. 197 35 891

(51) Int. Cl.[7] .............................. G01F 1/68; G01M 19/00
(52) U.S. Cl. ...................... 73/202.5; 73/204.22; 73/118.2
(58) Field of Search .................... 73/202, 202.5, 73/118.2, 204.21, 204.22, 204.25, 204.26, 204.11

(56) References Cited

U.S. PATENT DOCUMENTS 5,167,147 * 12/1992 Peters et al. ........................ 73/118.2
5,925,820 * 7/1999 Tank et al. .......................... 73/118.2

FOREIGN PATENT DOCUMENTS

| 36 27 465 C2 | 2/1987 | (DE) . |
| 39 41 330 C2 | 6/1990 | (DE) . |
| 43 38 891 A1 | 11/1993 | (DE) . |
| 44 07 209 C2 | 9/1995 | (DE) . |

* cited by examiner

*Primary Examiner*—Benjamin R. Fuller
*Assistant Examiner*—Jagdish Patel
(74) *Attorney, Agent, or Firm*—Ronald E. Greigg; Edwin E. Greigg

(57) ABSTRACT

A measurement device for measuring the mass of a medium flowing in a line along a line longitudinal axis, in particular the intake air mass of an internal combustion engine. The measuring device has a measuring element around which the flowing medium circulates around. The measuring element is disposed in a measurement conduit that is provided in the line and extends along a measurement conduit longitudinal axis from an inlet opening to a deflection conduit. The deflection conduit leads to an outlet opening that feeds back into the line. The measurement conduit longitudinal axis is inclined in relation to the line longitudinal axis by a predetermined angle ($\alpha$) so that the measurement conduit has a screened region that is disposed outside the parallel projection of the inlet opening along the line longitudinal axis. The measuring element is disposed in the screened region of the measurement conduit.

20 Claims, 3 Drawing Sheets

MEASUREMENT DEVICE FOR MEASURING THE MASS OF A MEDIUM FLOWING IN A LINE

PRIOR ART

The invention is based on a measurement device for measuring the mass of a medium flowing in a line. A measurement device has already been disclosed by DE 44 07 209 C2 in which a measurement conduit and a deflection conduit are integrated into a measurement module. The measurement conduit contains the measuring element and narrows increasingly in the flow direction starting from an inlet opening. The measurement conduit is adjoined by the deflection conduit, which is embodied in an S-shape and has a rectangular cross sectional profile. The measurement module is embodied as a component that can be plug connected. A carrier part of the measurement module can be inserted in a sealed fashion into the wall of the line to be measured and contains an electronic evaluation circuit.

A micromechanical component is particularly suited as the measuring element, for example of the kind that is known from DE 43 38 891 A1. With the measuring element known from DE 43 38 891 A1, two temperature-sensitive resistors are integrated into separate membranes, which can be comprised, for example, of silicon oxide or silicon nitride and have a low heat conductivity and a low specific heat capacity. The two temperatures-sensitive resistors are thermally insulated from each other by means of a silicon frame. While one of the temperature-sensitive resistors functions as an actual measurement sensor, the second temperature-sensitive resistor is used as a sensor for the temperature of the flowing medium.

Inclining a measuring element, which is for measuring the air quantity in an intake conduit, in relation to the flow direction by a predetermined angle in order to reduce the adhesion of suspended particles on the measuring element is known per se from DE 36 27 465 C2. Furthermore, this reference discloses providing wedge-shaped projections on the end faces of the measuring element oriented toward and away from the air flow, likewise in order to prevent the adhesion of suspended particles of the air flow. The embodiment of the wedge-shaped projections is produced by means of anisotropic etching of a silicon substrate. DE 39 41 330 C2 has disclosed inclining the surface of a temperature-sensitive measuring element by a predetermined angle in relation to the flow direction of the medium to be measured. Since the angular dependency of the measurement characteristic curve is relatively great when the measuring element is only slightly inclined in relation to the flow direction or in the extreme instance, is aligned parallel to the flow direction, but the angular dependency of the measurement characteristic curve is less when there are greater inclination angles between the measurement surface of the measuring element and the flow direction of the medium, then according to the teaching of this reference, a relatively reliable and reproducible measurement result is produced when the angle between the flow direction of the medium and the measurement surface of the measuring element lies in a range between 20° and 60°.

The known measurement devices, however, have the disadvantage that the measuring element can be destroyed by dirt particles, in particular dust particles, transported along in the flowing medium, when the dirt particles collide with the measuring element. In particular when micromechanical components of the type that are described, for example, in DE 43 38 891 A1 are used as measuring elements, the dirt particles can strike the membrane, which is embodied as relatively thin, and can damage the membrane permanently. Therefore, an increased wear of the measuring element can occur as well as an early failure. Furthermore, dirt particles that contain oil or grease can collect on the measuring element, particularly on its membrane, which act as adhesives for solid-bodied particles, e.g. dust or grains of sand, and permanently contaminate the measuring element. The heat coupling between the measuring element and the flowing medium is impaired by the contamination so that a displacement of the measurement characteristic curve is produced, which inevitably causes measurement errors. When the measurement device is used to detect the intake air in the intake conduit of an internal combustion engine, for example an erroneous triggering of the fuel injection valves can occur and consequently, a non-optimal adjustment of the fuel/air mixture can occur, so that the exhaust values of the internal combustion engine worsen with increasing contamination of the measuring element.

A further disadvantage of the known measurement device is comprised in that the measurement precision is still not optimal when there are pulsating flows in the line to be measured.

ADVANTAGES OF THE INVENTION

The measurement device according to the invention for measuring the mass of a medium flowing in a line, has the advantage over the prior art that an impingement on the measuring element by dirt particles entrained in the flowing medium is prevented to the greatest extent possible, but is at least reduced. In particular, the membrane of a measuring element, which is embodied as a micromechanical component, is protected to the greatest extent possible against collision with dirt particles entrained in the flowing medium by means of the steps according to the invention so that the service life of the measuring element can be significantly extended. Inclining the measurement conduit longitudinal axis in relation to the line longitudinal axis produces a region in the measurement conduit that is screened in relation to the flight paths of particles entrained in the flowing medium, and the dirt particles do not get into this region or only do so in significantly reduced numbers. By disposing the measuring element in this region, the danger of the collision of the dirt particles with the measuring element, in particular the thin and sensitive membrane of the measuring element, is considerably reduced. Since the collision of dirt particles that contain oil or grease against the measuring element is furthermore reduced, a contamination through the adhesion of dust or other solid-bodied particles to the measuring element, in particular on the surface of the membrane of a measuring element that is embodied as a micromechanical component, is largely prevented. This counteracts a change in the characteristic curve and increases the reliability of the measurement result produced. When the measurement device according to the invention is used to detect the intake air mass of an internal combustion engine, the exhaust values of the engine can therefore be improved.

Advantageous improvements and updates of the measurement device disclosed are possible by means of the measures disclosed herein after.

In particular, it is advantageous if in addition, the exit plane of the measurement device that spans the outlet opening, is inclined in relation to the line longitudinal axis by a predetermined angle. This measure considerably improves the dynamics in a pulsating flow of the medium to be measured and produces an improved flow of the medium through the measurement conduit and the deflection conduit of the measurement device. The measuring element can advantageously be fastened to a plate that protrudes into the measurement conduit and the upstream end face of this plate is beveled by means of one or a number of oblique faces. This measure reduces the adhesion of dirt particles to the upstream end face of the plate. The measurement plate is preferably aligned in relation to the main flow direction in the measurement conduit so that the medium strikes the upstream end face with a lateral flow component which is disposed in the plane of the bezel-like oblique face. By means of this flow component, dirt particles adhering to the oblique. face are acted on with a force component along the oblique face and are consequently removed from the sensitive region of the measuring element. This self-cleaning effect can further improve the characteristic curve stability of the measuring element.

In a similar manner, the end faces of the defining walls of the measurement conduit at the inlet opening are preferably aligned in relation to the main flow direction so that the medium strikes the end faces of the defining walls of the measurement conduit with a lateral flow component that lies in the plane of these end faces. In this manner, a force component is also produced, which acts on dirt particles adhering to the end faces and consequently removes them in a self-cleaning manner.

BRIEF DESCRIPTION OF THE DRAWINGS

Exemplary embodiments of the invention are shown in simplified fashion in the drawings and will be explained in more detail in the subsequent description.

DESCRIPTION OF THE EXEMPLARY EMBODIMENTS

Figure 1:
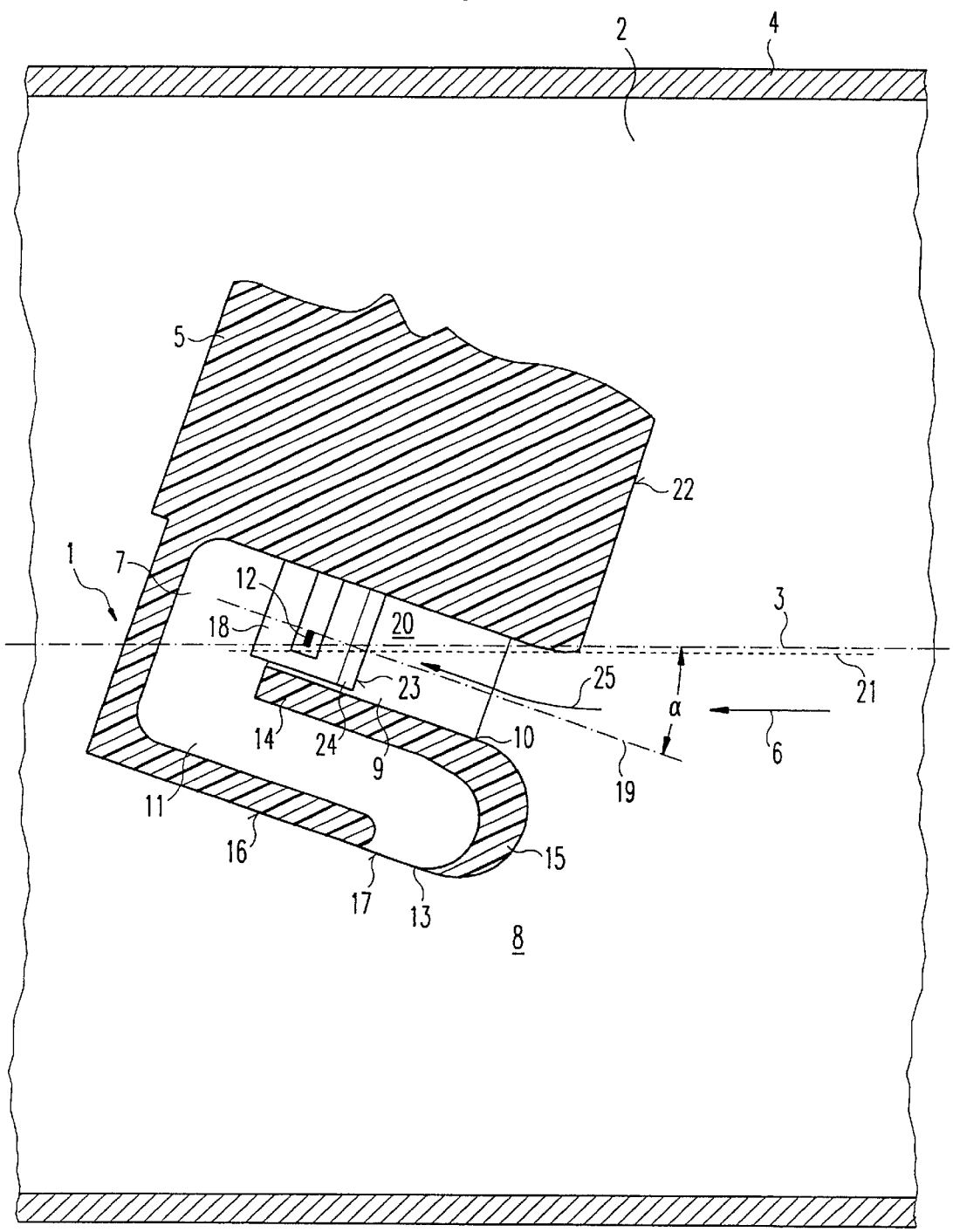
FIG. 1 is a partially sectional depiction of a side view of the measurement device according to the invention in accordance with a first exemplary embodiment.

FIG. 1 is a partially sectional representation of a side view of the measurement device 1 according to the invention, which is used to measure the mass of a flowing medium, in particular the intake air mass of internal combustion engines.

The measurement device 1 detects the mass of a medium flowing in a line 2. The line 2 is only shown schematically and extends at least in the region of the measurement device 1 along a line longitudinal axis 3. The line 2 can, for example, be an intake line of an internal combustion engine by way of which the engine can aspirate air from the environment. In the exemplary embodiments of FIGS. 1 and 2, the medium, e.g. the intake air, flows from right to left through the line 2. The flow direction in the line 2 is indicated by an arrow 6.

The measurement device 1 preferably has a slender, box-shaped form that extends radially in the line 2 and can preferably be: inserted, e.g. in a pluggable manner, into an opening of the line 2, not shown in the Figs., that is recessed into the wall 4 of the line 2. A fastening arm 5 of the measurement device is used to fasten the measurement device 1 to the wall 4 of the line 2. The fastening arm 5 can have a collar-shaped widening, not shown in the Figs., which is sealed in relation to the wall 4 of the line 2. The embodiment of the measurement device 1 has a plug module that can be plugged into the wall 4 of the line 2 permits a particularly simple assembly and maintenance. According to a preferred embodiment, an electronic evaluation circuit can be integrated into the fastening arm 5 and on a section of the securing arm 5 that protrudes out from the wall 4 of the line 2, corresponding connections can be provided for supplying the flow to the measurement device 1 and for scanning the measurement signals received from the measurement device 1.

The measurement device 1 can, for example, be made of one piece out of plastic as an injection molded plastic part. The measurement device 1 has a flow conduit 7, which is disposed after the fashion of a bypass line parallel to the main flow cross section 8 of the line 2.

The flow conduit 7 of the measurement device 1 is comprised of a measurement conduit 9, which extends from an inlet opening 10 to an S-shaped deflection conduit 11 that follows the measurement conduit 9 in the flow direction. The measurement conduit 9 contains a measuring element 12 and narrows in the flow direction starting from the inlet opening 10 toward the deflection conduit 11. The deflection conduit 11, however, has an essentially uniform, rectangular flow cross section and conveys the medium, which is flowing through the flow conduit 7 of the measurement device 1, to an outlet opening 13. A dividing wall 1 4 separates the measurement conduit 9 from the deflection conduit 11. A body 15 that is rounded in cross section adjoins the dividing wall 14 and presents only a slight flow resistance against the (inflowing medium. The outlet opening 13 is disposed on a surface 16 of the measurement device 1, which is disposed opposite the inner surface of the wall 4 of the line 2.

The measuring element 12 is preferably embodied as a micromechanical component, as has been proposed, for example, in DE 43 38 891 A1. In an intrinsically known manner, the measuring element has at least one, preferably two temperature-sensitive resistor elements, which are embodied on a dielectric membrane, e.g. made of silicon oxide or silicon nitride. The resistor elements are separated from each other, e.g. by means of a silicon frame. The dielectric membrane additionally has the advantage of only a low heat capacity and a relatively low thermal conductivity so that the response behavior of the measuring element is relatively short.

Figure 2:
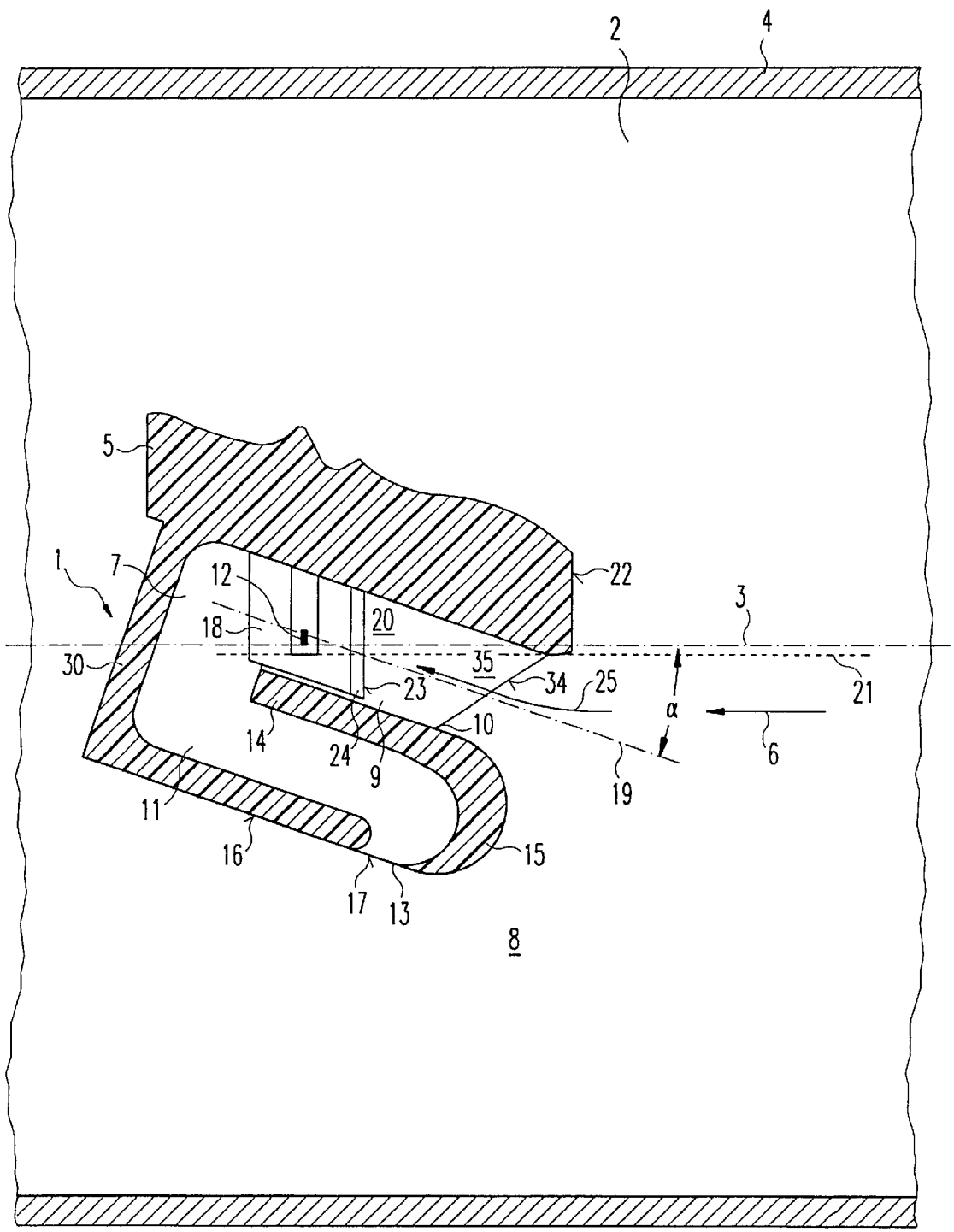
FIG. 2 is a partially sectional depiction of a side view of a measurement device according to the invention in accordance with a second exemplary embodiment.

In the preferred exemplary embodiments shown in FIGS. 1 and 2, the measuring element 12 has a plate-shaped carrying body on a silicon base, with a membranes-shaped sensor region produced by being etched out, with an extremely slight thickness and a number of resistor layers also produced by being etched out. These resistor layers constitute at least one temperature-sensitive measuring resistor and for example a heating resistor. Preferably, the heating resistor is disposed in the center of the membrane and is regulated at an excess temperature with the aid of a temperature sensor. Two measuring resistors are disposed upstream and downstream of the heating region constituted by the heating resistor and are disposed symmetrically to the heating region. The carrying body of the measuring element 12 is accommodate d flush in a recess of a receptacle that is comprised, for example, of metal, and is secured, for example, by means of adhesive. This receptacle is referred to below as the plate 18. The plate 18 protrudes into the measurement conduit 9 so that the medium flowing through the flow conduit 7 is circulated around the measuring element 12 of the measurement device 1.

According to the invention, a measurement conduit longitudinal axis 19, which extends centrally through the measurement conduit 9, is inclined in relation to the line longitudinal axis 3 by a predetermined angle α. By means of this measure, the measurement conduit 9 has a screened region 20, which is disposed outside the parallel projection of the inlet opening 10 of the measurement conduit 9 along the line longitudinal axis 3. In FIGS. 1 and 2, the screened region is disposed above the dashed line 21. The dashed line 21 symbolizes a flight path of a dirt particle with a relatively high mass, which is entrained in the medium flowing through the line 2. Particles of this kind can considerably damage the measuring element 12, in particular its membrane when the measuring element 12 is embodied as a micromechanical component. However, a collision of a damaging dirt particle with the measuring element 12 is effectively prevented by the embodiment according to the invention. In the inlet region of the measurement conduit 9, the dirt particles that would damage to the measuring element 12 are only insignificantly deflected in the direction of the measurement conduit longitudinal axis 19 due to their relatively high inertial mass. The flight path 21 of the damaging particles therefore extends essentially in a straight line. Dirt particles whose flight path extends above the dashed line 21 in FIGS. 1 and 2 do not travel into the inlet opening 10 of the measurement conduit 1, but strike against the surface 22 of the measurement device 1. Therefore there are almost no damaging dirt particles to be found in the screened region 20 of the measurement conduit 9, which is disposed above the dashed line 21 in FIGS. 1 and 2. The invention also proposes disposing the measuring element 12 in this screened region 20. Preferably, the measuring element 12 should be disposed in the vicinity of the center of the measurement conduit 9, where the greatest flow speed prevails and therefore the greatest measurement sensitivity must be produced.

According to a preferred embodiment, on its upstream end face 23, the plate 18 has at least one bezel-like slanted oblique face 24. Preferably, an oblique face 24 of this kind is also embodied on the other side of the upstream end face23 so that on the end face 23, the plate 18 tapers like a knife blade counter to the main flow direction. The main flow direction of the measurement conduit 9 is indicated in FIGS. 1 and 2 by the arrow 25. The bezel-like slanting has the advantage that no stagnation point forms at the contamination-susceptible leading edges of the plate 18, at which the outflowing medium is braked and dirt particles can collect on the end face 23 of the plate 18. Fundamentally, it is also possible to embody the plate 18 and the measuring element 12 of one piece, particularly if the measuring element 12 is manufactured as a micromechanical component on a silicon substrate. The oblique face 24 or the oblique faces provided on both sides, can in this connection be produced in a simple manner, e.g. by means of anisotropic etching of the silicon substrate.

In the exemplary embodiments shown in FIGS. 1 and 2, the measurement conduit 9, the plate 18 together with the measuring element 12, and the deflection conduit 11 are embodied as an integral measurement module. In the exemplary embodiments depicted, therefore, not only in the measurement conduit longitudinal axis 19 inclined in relation to the line longitudinal axis 3 by the predetermined angle α, but so is the entire measurement module including the deflection conduit 11. Therefore, a conventional measurement module that can be mass produced can be used, wherein the inclination angle α merely has to be adjusted so that the measuring element 12 is disposed in the screened region 20 of the measurement conduit 9. By inclining the entire measurement module in relation to the line longitudinal axis 3, the exit plane 17 that spans the outlet opening 13 is simultaneously also inclined in relation to the line longitudinal axis 3. The outlet opening 13 is therefore disposed in the lee of the prevailing flow of the medium in the line 2, i.c. on the side remote from the inflow of the medium. This has additional advantages since a significantly more uniform flow through the flow conduit 7 of the measurement device 1 is produced and in particular greater dynamics when there is a pulsating flow of the medium in the line 2. If a return flow occurs in the line 2 counter to the flow direction indicated by the arrow 6, the outlet opening 13 is disposed on the side oriented toward the return flow and can act as an inlet opening for the return flow so that a return flow of this kind can also in principle be detected by the measurement device 1.

FIG. 2 shows a second exemplary embodiment that differs slightly from the exemplary embodiment shown in FIG. 1. Elements that have already been described are labeled with corresponding reference numerals so that a repetitious description can thus be omitted.

A difference of the exemplary embodiment shown in FIG. 2 in relation to the exemplary embodiment shown in FIG. 1 is comprised firstly in the fact that the fastening arm 5 is guided radially in the line 2 without an axial directional component and therefore, the wall 30 of the flow conduit 7 is inclined in relation to the fastening arm 5.

Figure 3:
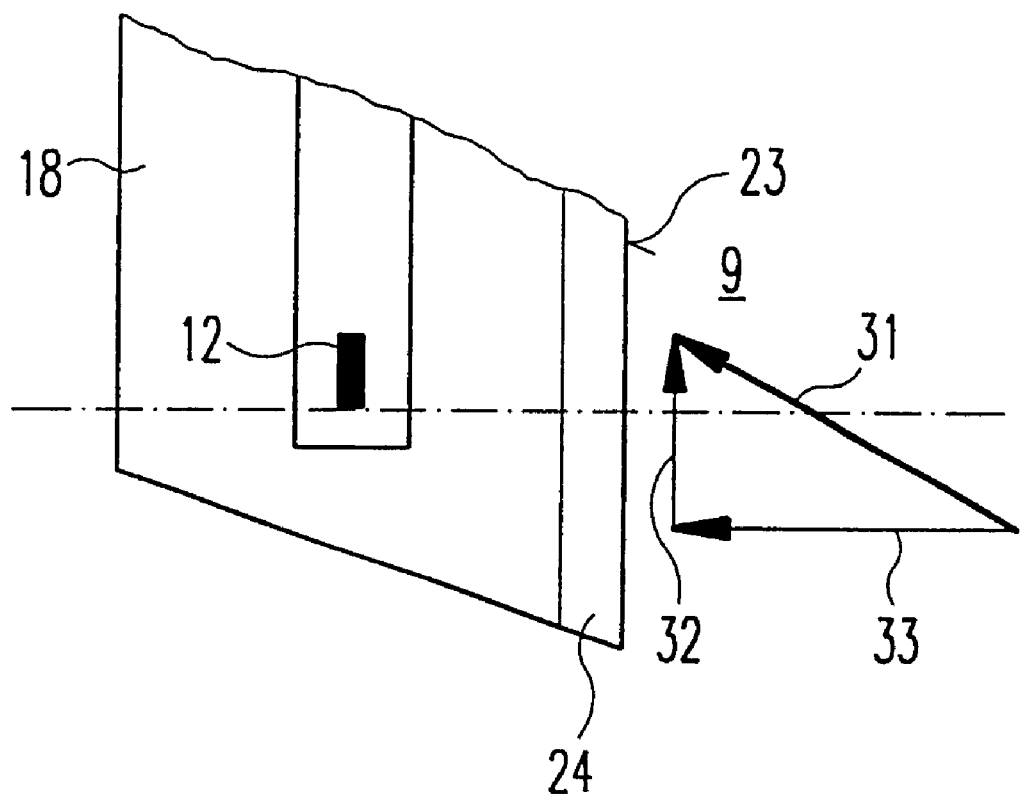
FIG. 3 is a schematic representation of the flow conditions at the upstream end face of a plate to which the measuring element is attached.

Another difference is comprised in that the upstream end face 23 of the plate 18 is aligned in the measurement conduit 9 in relation to the main flow direction of the medium indicated by the arrow 25 so that the medium strikes against the upstream end face 23 with a lateral flow component which lies in the plane of the oblique face 24. In order to more clearly depict the flow conditions at the end face 23 of the plate 18, the plate 18 with the measuring element 12 is depicted in an enlarged form in FIG. 3. The main flow direction of the medium in the measurement conduit 9 is also drawn in. The main flow direction in the inflow region of the end face 23 of the plate 18 occurs essentially parallel to the measurement conduit longitudinal axis 19. The main flow direction is indicated by the arrow 31 in FIG. 3. When it strikes the end face 23 of the plate 18, the main flow is vectorially divided into two flow components shown in FIG. 3 by the arrows 32 and 33. The arrow 32 indicates a lateral flow component which lies in the plane of the oblique face 24. This lateral flow component exerts a force component, which is directed upward in FIG. 3, on the dirt particles adhering to the oblique face 24 and displaces the dirt particles along the oblique face 25 lateral to the main flow direction 31. As a result, a self-cleaning effect of the bezel-like oblique face 24 is produced, since dirt particles adhering to the oblique face 24 are either loosened and removed by the lateral flow component or are displaced into the lateral end region of the bezel-like oblique face 24 where they have no significant influence on the characteristic curve of the measuring element 12. A displacement of the characteristic curve of the measuring element 12 due to dirt particles adhering to the plate 12 is therefore reduced by this measure and the reliability and measurement precision of the measurement device 1 according to the invention is increased further.

In the exemplary embodiment shown in FIG. 2, the plate 18 in the measurement conduit 9 is aligned so that the inclination angle of the plate 18 in the measurement conduit 9 corresponds to the inclination angle α that the conduit longitudinal axis 19 assumes in relation to the line longitudinal axis 3. The plate 18 is therefore positioned at least with its upstream end face 23 radial or perpendicular to the line longitudinal axis 3. However, this is not absolutely required. On the contrary, the plate 18 can also be inclined in the measurement conduit 9 by an angle that deviates from the angle α, wherein the optimal inclination angle of the plate 18 in the measurement conduit 9 is to be optimized as a function of the flow speed of the medium, the opening cross section of the measurement conduit 9, and other parameters.

A similar measure is provided at the inlet opening 10 in order to also prevent the adhesion of dirt particles to the greatest extent possible there as well. The measurement conduit 9 has two defining walls that are offset from each other perpendicular to the plane of the drawing in FIG. 2. Only the rear defining wall 35 can be seen in FIG. 2. the defining wall 35 has an end face 34 at the inlet opening 10. A corresponding end face is embodied at the inlet opening 10 on the second defining wall of the measurement conduit 9 which is offset perpendicular to the plane of the drawing. In the exemplary embodiment shown in FIG. 2, the end faces 34 of the defining walls 35 are not aligned perpendicular to the main flow direction of the measurement conduit 9 indicated by the arrow 25. On the contrary, the end faces 34 are inclined so that the medium strikes the end faces 34 of the defining walls 35 of the measurement conduit 9 with a lateral flow component that lies in the plane of the end faces 34. This produces the self-cleaning effect that has already been described with reference to the plate 18, and dirt particles that adhere to the end faces 34 are loosened and removed or are at least displaced along the end faces 34 to one of the ends of the end faces 34.

The invention is not limited to the exemplary embodiments. The measurement conduit 9 and the deflection conduit 7 can also be embodied otherwise if this is appropriate for the corresponding intended use. The measurement device 1 according to the invention is suitable for measuring the mass of flowing mediums in both gas and liquid forms.

The foregoing relates to preferred exemplary embodiments of the invention, it being understood that other variants and embodiments thereof are possible within the spirit and scope of the invention, the latter being defined by the appended claims.

What is claimed is:

1. A measurement device (1) for measuring mass flow of an intake air medium flowing in a line (2) along a line longitudinal axis (3) of said line (2) of an internal combustion engine, said device including a measurement conduit (9) provided in said line (2), said measurement conduit having an air inlet opening (10), a measuring element (12) around which the flowing medium circulates and which is disposed in the measurement conduit (9), a deflection conduit (11) extending from said measurement conduit (9) and having an outlet opening (13), said measurement conduit extends along a measurement conduit longitudinal axis (19) from the inlet opening (10) to the deflection conduit (11), said deflection conduit leads to the outlet opening (13) that feeds back into the line (2), the measurement conduit longitudinal axis (19) is inclined in relation to the line longitudinal axis (3) of the line (2) by a predetermined angle (α) so that the measurement conduit (9) has a screened region (20) that is disposed behind the inlet opening (10) along the line longitudinal axis (3), and the measuring element (12) is disposed in the screened region (20) of the measurement conduit (9).

2. The measurement device according to claim 1, in which the outlet opening (13) has an exit plane (17) that is inclined in relation to the line longitudinal axis (3) by the predetermined angle (α).

3. The measurement device according to claim 2, further including a plate (18) having an upstream end (23), the measurement element (12) being fastened to the plate (18), said measurement element (12) and the plate (18) protrude into the measurement conduit (9) and the upstream end face (23) of said plate (18) is slanted to form at least one bezel-like oblique face (24).

4. The measurement device according to claim 1, further including a plate (18) having an upstream end (23), the measurement element (12) being fastened to the plate (18), said measurement element (12) and the plate (18) protrude into the measurement conduit (9) and the upstream end face (23) of said plate (18) is slanted to form at least one bezel-like oblique face (24).

5. The measurement device according to claim 2, in which the measurement conduit (9) has a wall (35) defining an end face (34) at the inlet opening (10), the end face (34) is aligned in relation to main flow direction (25) of the measurement conduit (9) so that the flowing medium strikes the end face (34) with a lateral flow component that lies in a plane of the end face (34).

6. The measurement device according to claim 2, in which the measurement conduit (9) tapers along a main flow direction (25) of the medium flowing through the measurement conduit (9).

7. The measurement device according to claim 2, in which the deflection conduit (11) is formed in an S-shape.

8. The measurement device according to claim 1, in which the measurement conduit (9), the measuring element (12), and the deflection conduit (11) define a measurement module that is inserted into the line (2) so that the measurement conduit longitudinal axis (19) is inclined in relation to the line longitudinal axis (3) by the predetermined angle (α).

9. The measurement device according to claim 8, further including a plate (18) having an upstream end (23), the measurement element (12) being fastened to the plate (18), said measurement element (12) and the plate (18) protrude into the measurement conduit (9) and the upstream end face (23) of said plate (18) is slanted to form at least one bezel-like oblique face (24).

10. The measurement device according to claim 9, in which the upstream end face (23) of the plate (18) is aligned in relation to a main flow direction (25) in the measurement conduit (9) so that the flowing medium strikes the upstream end face (23) with a lateral flow component (32) that lies in a plane defined by the bezel-like oblique face (24).

11. The measurement device according to claim 8, in which the measurement conduit (9) has a wall (35) defining an end face (34) at the opening (10), the end face (34) is aligned in relation to a main flow direction (25) of the measurement conduit (9) so that the flowing medium strikes the end face (34) with a lateral flow component that lies in a plane of the end face (34).

12. The measurement device according to claim 8, in which the measurement conduit (9) tapers along a main flow direction (25) of the medium flowing through the measurement conduit (9).

13. The measurement device according to claim 8, in which the deflection conduit (11) is formed in an S-shape.

14. The measurement device according to claim 3, in which the upstream end face (23) of the plate (18) is aligned in relation to a main flow direction (25) in the measurement conduit (9) so that the flowing medium strikes the upstream end face (23) with a lateral flow component (32) that lies in a plane defined by the bezel-like oblique face (24).

15. The measurement device according to claim 14, in which the upstream end face (23) of the plate (18) is aligned in relation to a main flow direction (25) in the measurement conduit (9) so that the flowing medium strikes the upstream end face (23) with a lateral flow component (32) that lies in a plane defined by the bezel-like oblique face (24).

16. The measurement device according to claim 14, in which the measurement conduit (9) has a wall (35) defining an end face (34) at the inlet opening (10), the end face (34) is aligned in relation to a main flow direction (25) of the measurement conduit (9) so that the flowing medium strikes the end face (34) with a lateral flow component that lies in a plane of the end face (34).

17. The measurement device according to claim 1, in which the measurement conduit (9) has a wall (35) defining an end face (34) at the inlet opening (10), the end face (34) is aligned in relation to a main flow direction (25) of the measurement conduit (9) so that the flowing medium strikes the end face (34) with a lateral flow component that lies in a plane of the end face (34).

18. The measurement device according to claim 1, in which the measurement conduit (9) tapers along a main flow direction (25) of the medium flowing through the measurement conduit (9).

19. The measurement device according to claim 1, in which the deflection conduit (11) is formed in an S-shape.

20. The measurement device according to claim 1, in which the measuring element (12) defines a micromechanical component and the measuring element (12) includes a membrane and at least one resistor element disposed on the membrane.

* * * * *